United States Patent
Miura et al.

(10) Patent No.: US 7,674,413 B2
(45) Date of Patent: Mar. 9, 2010

(54) PROCESS FOR PRODUCING CYCLOOLEFIN RESIN COMPOSITION

(75) Inventors: Kimiyoshi Miura, Hatsukaichi (JP); Sadao Yoshimoto, Iwakuni (JP); Noboru Koga, Iwakuni (JP); Takeshi Suzuki, Otake (JP); Atsushi Shibuya, Funabashi (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 195 days.

(21) Appl. No.: 11/794,237

(22) PCT Filed: Dec. 27, 2005

(86) PCT No.: PCT/JP2005/023973

§ 371 (c)(1), (2), (4) Date: Jun. 27, 2007

(87) PCT Pub. No.: WO2006/070837

PCT Pub. Date: Jul. 6, 2006

(65) Prior Publication Data

US 2007/0299199 A1  Dec. 27, 2007

(30) Foreign Application Priority Data

Dec. 28, 2004  (JP)  ............................. 2004-379369

(51) Int. Cl.
*D01F 1/02* (2006.01)
*A21C 1/10* (2006.01)
*A21C 1/00* (2006.01)
*B29B 7/00* (2006.01)
*B29C 47/10* (2006.01)
*B28C 1/16* (2006.01)
*A21C 1/06* (2006.01)
*B01F 7/08* (2006.01)
*B01F 7/24* (2006.01)
*B28C 3/00* (2006.01)

(52) U.S. Cl. ..................... 264/211; 264/211.21; 366/75; 366/76.1; 366/76.4; 366/83; 366/85

(58) Field of Classification Search ............ 264/211.13, 264/211.21, 211.23, 211; 366/75, 76.1, 76.4, 366/83, 85; 425/205, 207, 209
See application file for complete search history.

(56) References Cited

U.S. PATENT DOCUMENTS 4,913,864 A * 4/1990 Soga et al. ..................... 264/41

(Continued)

FOREIGN PATENT DOCUMENTS

JP    06-228323 A    8/1994

(Continued)

*Primary Examiner*—Khanh Nguyen
*Assistant Examiner*—Matthew Hoover
(74) *Attorney, Agent, or Firm*—Buchanan Ingersoll & Rooney PC

(57) ABSTRACT

A process for producing a cycloolefin resin composition comprising a cycloolefin resin and an additive by using a twin-screw extruder is provided, in which loss of the additive caused by volatilization through a vent during kneading is reduced and kneading of resin material with the additive can be sufficiently carried out. When the cycloolefin resin and the additive are kneaded by using a vented twin-screw extruder (10) to produce the cycloolefin resin composition containing the additive, an additive introduction opening (3) is disposed downstream of a vent (2) located nearest to a discharge opening (13) of the twin-screw extruder, and the additive is charged through the additive introduction opening located at a distance from the discharge opening of the twin-screw extruder in the range between longer than 10D and not longer than 30D.

24 Claims, 1 Drawing Sheet

U.S. PATENT DOCUMENTS

| | | | |
|---|---|---|---|
| 5,362,811 A * | 11/1994 | Sueyoshi et al. | 525/198 |
| 5,439,973 A * | 8/1995 | Yamamoto et al. | 525/66 |
| 6,252,036 B1 * | 6/2001 | Hatono et al. | 528/274 |
| 6,686,405 B1 * | 2/2004 | Kawahara et al. | 524/127 |
| 2002/0060378 A1 * | 5/2002 | Miyamoto et al. | 264/211 |

FOREIGN PATENT DOCUMENTS

| | | |
|---|---|---|
| JP | 09-143222 A | 6/1997 |
| JP | 2000-202887 A | 7/2000 |
| JP | 2002-284885 A | 10/2002 |
| JP | 2003-071829 A | 3/2003 |

* cited by examiner

PROCESS FOR PRODUCING CYCLOOLEFIN RESIN COMPOSITION

FIELD OF THE INVENTION

The present invention relates to a process for producing a cycloolefin resin composition comprising a thermoplastic resin, especially a cycloolefin resin and an additive. More particularly, the present invention relates to a process for producing a cycloolefin resin composition in which the additive loss caused by volatilization through a vent during melt kneading with a twin-screw extruder is reduced and the additive is sufficiently kneaded together with the resin material.

BACKGROUND OF THE INVENTION

The extruder is generally equipped with a hopper to which a resin material is fed, a screw by which a material is transported, kneaded and pressurized, a cylinder (a barrel) having a function of externally heating and cooling the resin material and a vent by which gaseous volatile components are discharged and the like, and a die is installed at the tip of the extruder. In order to produce a molded article by using such extruder, the resin material is first fed into the hopper and the fed resin material is transported to the front by the rolling screw and is heated from the cylinder side to melt gradually and gaseous volatile components contained in the melted resin material are discharged from the vent, followed by pressurizing and passing the melted resin material through the die to mold.

In producing a molded article by an extruder, an additive such as a stabilizer is blended into a resin and the additive is usually mixed with a resin material and the mixture is fed from a hopper. However, part of the additive kneaded with the resin material in the extruder was sometimes discharged from a vent hole, which was uneconomical. Further, kneading of a resin material and an additive was sometimes insufficient depending on the kneading conditions.

As a technique to solve such problems, in Japanese Patent Laid-Open Publication No. 2000-202887, there is disclosed a process for producing a resin composition in which a liquid additive is added to a thermoplastic resin. In said production process, there is disclosed a process in which the liquid additive is added from a feed opening provided between a final vacuum vent and a die and further there are provided functions of counterflow of the additive to the vent and distribution mixing. In said Japanese Patent Laid-Open Publication, a preferable range of L/D between the additive introduction opening and the die is set in the range of from 5 to 10.

While, since a cycloolefin resin is frequently applied to optical members utilizing the characteristics of transparency, favorable optical characteristics are demanded. However, when the similar addition method as described in Japanese Patent Laid-Open Publication No. 2000-202887 was performed for the purpose of blending various additives with a cycloolefin resin, there was a problem that favorable optical characteristics were not maintained if the L/D between the additive introduction opening and the die is in the range of from 5 to 10.

Further, the water absorption coefficient of a cycloolefin resin is extremely low, and the water which has been contained in a resin during high temperature and high humidity testing coagulates, sometimes leading to the occurrence of fine cracking. As a means to solve this problem, a hydrophilic additive is required to be added, however, as mentioned above, there was a problem that if the hydrophilic additive was added by a known method, favorable optical characteristics were not maintained.

DISCLOSURE OF THE INVENTION

Problems to be Solved by the Invention

The problem of the present invention is to provide a process for producing a cycloolefin resin composition in which, when a cycloolefin resin composition comprising a cycloolefin resin and an additive is produced by a twin-screw extruder, the additive loss caused by volatilization through a vent during melt kneading is reduced and the additive may be sufficiently kneaded together with the resin material. Moreover, the problem of the present invention is to provide a process for producing a cycloolefin resin composition which is sufficiently fit for use as an optical member.

Means to Solve the Problems

As a result of earnest studies to solve the above problems, it was found out that a cycloolefin resin composition especially useful for using as an optical member may be produced by accurately adjusting the introduction position of an additive. In other words, the present invention is a production process of the following (1) to (6).

(1) A process for producing a cycloolefin resin composition in which, when a cycloolefin resin composition containing an additive is produced by kneading an cycloolefin resin and an additive by a twin-screw extruder equipped with a vent, an additive introduction opening is disposed downstream from the vent located nearest to the discharge opening of the twin-screw extruder and the distance between the additive introduction opening and the discharge opening of the twin-screw extruder is longer than 10D and not longer than 30D.

(2) A process for producing a cycloolefin resin composition described in (1) characterized in that said twin-screw extruder equipped with a vent has an L/D of the screw in the range of 39 to 60.

(3) A process for producing a cycloolefin resin composition described in (1) or (2) in which said twin-screw extruder equipped with a vent has a seal ring between the vent disposed nearest to the discharge opening and the additive introduction opening.

(4) A process for producing a cycloolefin resin composition described in any one of (1) to (3) in which said twin-screw extruder equipped with a vent has a kneading disk segment or a rotor kneading segment at a location of 0D to 25D downstream from the additive introduction opening.

(5) A process for producing a cycloolefin resin composition described in any one of (1) to (4) in which said cycloolefin resin composition is used for an optical member.

(6) A process for producing a cycloolefin resin composition described in any one of (1) to (4) in which said additive is a hydrophilic stabilizer.

Effect of the Invention

The process of the present invention is economical because the additive loss caused by volatilization through a vent is reduced when a cycloolefin resin and an additive are kneaded.

Further, the process of the present invention using a twin-screw extruder equipped with a vent having a kneading disk segment or a rotor kneading segment is economical because the additive loss caused by volatilization through a vent is reduced when a cycloolefin resin and an additive are kneaded and enables a resin material and an additive to be sufficiently kneaded.

Furthermore, by using the process of the present invention, there may be obtained a resin composition which has less deterioration of a resin, a good hue and transparency and a small haze value because of a good dispersion of an additive as well as extremely small generation of fine cracking especially in the case of a composition of a high hydrophilic cycloolefin resin and a hydrophilic stabilizer. As the result, the process of the present invention may provide a cycloolefin resin composition extremely useful for an optical member.

EXPLANATION OF THE SYMBOL

Figure 1:
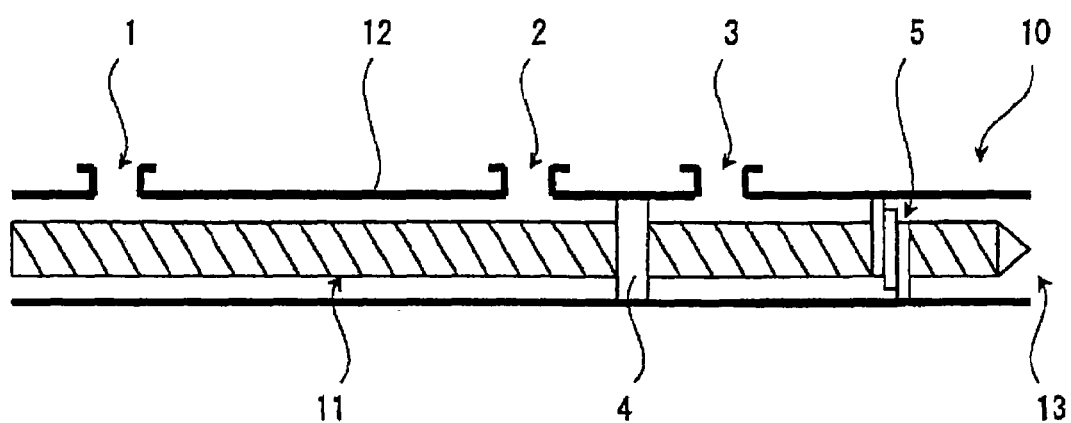
FIG. 1 is a schematic sectional view showing an example of a twin-screw extruder used in the present invention.

1 . . . Resin feeding opening
2 . . . Vent
3 . . . Additive introduction opening
4 . . . Seal ring
5 . . . Kneading disk segment
10 . . . Twin-screw extruder
11 . . . Screw
12 . . . Barrel
13 . . . Discharge opening

BEST MODE FOR CARRYING OUT THE INVENTION

Hereinafter, a process for producing a cyclcoolefin resin composition relating to the present invention will be specifically explained.

In the present invention, in producing a cyclcoolefin resin composition containing an additive by kneading a cycloolefin resin and an additive with a twin-screw extruder equipped with a vent, said additive is added from the additive introduction opening disposed downstream from a vent located nearest to the discharge opening.

As the twin-screw extruder used for the production process of a cycloolefin resin composition relating to the present invention, there may be mentioned, for example, an extruder as shown in FIG. 1. FIG. 1 is a schematic sectional view showing an example of a twin-screw extruder used in the present invention. In the FIGURE, 1 represents a resin feeding opening, 2 a vent, 3 an additive introduction opening, 4 seal ring, 5 a kneading disk segment, 11 a screw, 12 a barrel having a heating means and 13 a discharge opening.

The screw 11 in the twin-screw extruder 10 has a diameter (D) of 30 to 400 mm and the ratio (L/D) of the diameter (D) to the length (L) is in the range of 39 to 60 and preferably in the range of 45 to 55. If the L/D of the screw is within the above range, a cycloolefin resin and an additive may be sufficiently kneaded. In addition, if the L/D of the screw is within the above range, the resin composition has less deterioration of a resin, a good hue and transparency.

Further, the screw arrangement may be optionally performed as long as the object of the present invention is not impaired. Moreover, the distance between the additive introduction opening 3 and the discharge opening 13 is longer than 10D and not more than 30D, preferably longer than 10D and not more than 27D and more preferably longer than 10D and not more than 24D. If the distance between the additive introduction opening and the discharge opening is within the above range, a cycloolefin resin and an additive may be sufficiently kneaded. Furthermore, the distance between the additive introduction opening and the discharge opening is within the above range, the resin composition has less deterioration of a resin, a good hue and transparency. The kneading disk segment 5 is disposed at a location of 0D to 25D, preferably at a location of 3D to 23D and more preferably at a location of 6D to 21D downstream from the additive introduction opening. If the kneading disk segment is disposed at the above location, a resin and an additive may be sufficiently kneaded, granulation is easily conducted, and further the resin composition has less deterioration of a resin, a good hue and transparency.

The seal ring 4 is disposed between the vent 2 and the additive introduction opening 3. If the seal ring is disposed at this location, the volatilization of an additive may be effectively prevented. In FIG. 1, the twin-screw extruder 10 has the kneading disk segment 5 in the downstream direction to the additive introduction opening 3. However, in the present invention, the kneading disk segment 5 may be a rotor kneading segment, and the kneading disk segment or the rotor kneading segment may not be disposed. If the kneading disk segment or the rotor kneading segment are disposed at a specific location in the downstream direction to the additive introduction opening, a cycloolefin resin and an additive may be sufficiently kneaded.

Moreover, in FIG. 1, the twin-screw extruder 10 has a vent and an additive introduction opening disposed at only one location. However, in the present invention, a plurality of vents may be disposed upstream from the seal ring 4 and a plurality of additive introduction openings may be disposed downstream from the vent located close to the discharge opening.

In producing a cycloolefin resin composition by using such twin-screw extruder, a cycloolefin resin is first fed from the resin feeding opening 1. The fed cycloolefin resin is transported to the front by the screw 11 and simultaneously heat melted by a heating device which is not shown in the FIGURE. The gaseous volatile components contained in the melted cycloolefin resin are discharged from the vent 2.

An additive blended in a cycloolefin resin is fed from the additive feeding opening 3 and transported to the front by the screw 11 and simultaneously kneaded with the cycloolefin resin and further kneaded by the kneading disk segment 5.

A cycloolefin resin composition in which the additive thus obtained is blended, is extruded from a die not shown in the FIGURE and is cut to obtain a product. A process of producing a cycloolefin resin composition relating to the present invention is effective in using an additive which volatilizes under the melt-kneading conditions.

A cycloolefin resin composition obtained by using a production process of the present invention, in which an additive is suitably dispersed, is highly useful as a raw material for various molded articles such as, for example, films or sheets, injection molded articles, vacuum molded articles and blow molded articles. The cycloolefin resin composition especially exhibits a high effect on an article which requires a long-term retention of strength and an article which requires transparency. Among them, in an optical member, extremely favorable optical characteristics may be retained by favorable dispersion of an additive. For example, there may be obtained a composition having a haze value of 0.01 to 1.5 and preferably of 0.1 to 1.2. Moreover, there may be obtained a stable composition having a haze variation value under the condition of high temperature and high humidity (temperature; 80° C., relative humidity; 90%, left standing for 48 hours) of 0 to 2, preferably 0 to 1 and more preferably 0 to 0.5.

(Cycloolefin Resin)

The cycloolefin resin of the present invention is selected from, for example, a (co)polymer containing an alicyclic structure in part or all of the recurring structural units, a copolymer of styrene with α-olefin or nonconjugated polyene and the like. As the (co)polymer containing an alicyclic structure in part or all of the recurring structural units, there may be mentioned, for example, a copolymer represented by the following general formula (1).

[Formula 1]

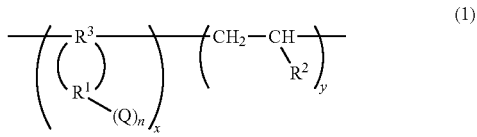

(1)

(In the formula, x and y represent a copolymerization ratio and are real numbers satisfying $0/100 \leq y/x \leq 95/5$, n represents a substitution number of a substituent Q and an integer of $0 \leq n \leq 2$. $R^1$ is one kind or two or more kinds of groups selected from hydrocarbon groups having 2 to 20 carbon atoms with a valence of 2+n, $R^2$ is one kind or two or more kinds of monovalent groups selected from a hydrogen atom and constituent groups which comprise carbon and hydrogen and have not less than 1 and not more than 10 carbon atoms, $R^3$ is one kind or two or more kinds of divalent groups selected from hydrocarbon groups having 2 to 10 carbon atoms, Q is one kind or two or more kinds of divalent groups selected from constituent groups represented by $COOR^0$ ($R^0$ is one kind or two or more kinds of monovalent groups selected from a hydrogen atom and constituent groups which comprise carbon and hydrogen and have not less than 1 and not more than 10 carbon atoms.)).

More preferably, as each symbol in said general formula (1), there may be mentioned the following conditions and these conditions are used in combination where necessary.

[1] A $R^1$ group is a group having a cyclic structure at least at one site in the structure.

[2] $R^3$ is exemplified structures (a), (b) and (c) as the exemplification of the constituent unit containing this group (when n=0);

[Formula 2]

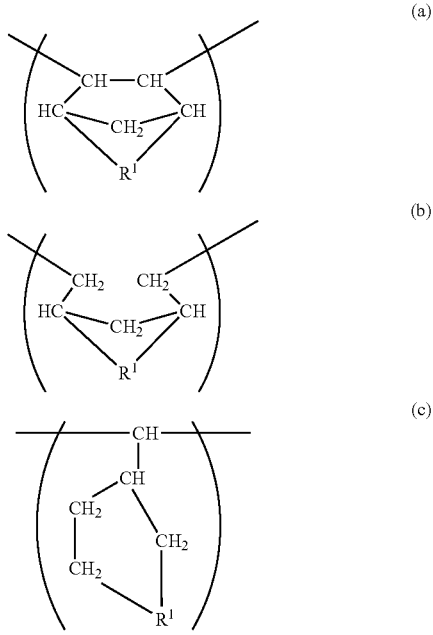

(Note, in the formula, $R^1$ is the same as above.)

[3] n is 0.

[4] y/x is a real number satisfying $20/80<y/x<65/35$.

[5] $R^2$ is a hydrogen atom and/or —$CH_3$.

[6] Q is a —COOH or —$COOCH_3$ group.

More preferably, in said general formula (1), a $R^1$ group is a divalent group represented by the general formula (2);

[Formula 3]

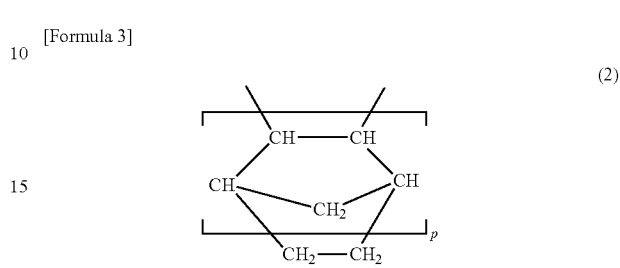

(2)

(wherein p is an integer of 0 to 2.)

Further, preferably, a $R^1$ group is a divalent group in which p is 1 in said general formula (2).

A cycloolefin resin used in the present invention may contain recurring structural units derived from other copolymerizable monomer if needed so long as the good properties of a product obtained by a molding process of the present invention are not impaired. The copolymerization ratio is not limited but preferably is not more than 20 mol % and more preferably is not more than 10 mol %.

The type of copolymerization is not at all restricted in the present invention, and there may be adopted known various copolymerization types such as a random copolymer, a block copolymer and an alternate copolymerization. However, preferable is a random copolymer.

The molecular weight of a cycloolefin resin used in the present invention is not limited, but the cycloolefin resin has an intrinsic viscosity [η] measured in decalin at 135° C. of preferably 0.03 to 10 dl/g, more preferably of 0.05 to 5 dl/g and most preferably of 0.10 to 2 dl/g. The cycloolefin resin has a crystallinity, measured by X-ray diffractometry, preferably of not more than 5% and more preferably not more than 1%.

In the present invention, preferably used is a cycloolefin resin obtained by using a cycloolefin represented by the following general formulas (3) or (4) as a raw material monomer.

[Formula 4]

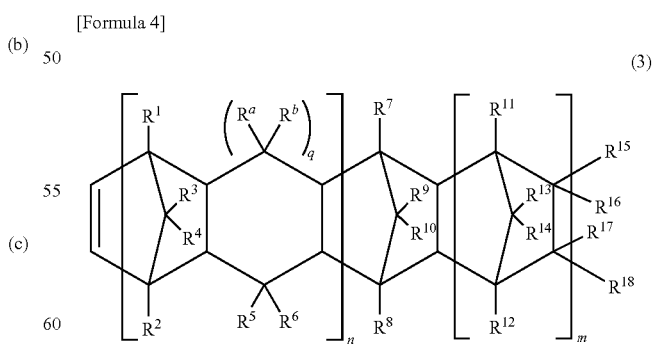

(3)

In the above general formula (3), n is 0 or 1, m is 0 or a positive integer. $R^1$ to $R^{18}$, $R^a$ and $R^b$ each independently represent an atom or a group selected from the group consisting of a hydrogen atom, a halogen atom and a hydrocarbon group.

Here, a halogen atom is a fluorine atom, chlorine atom, bromine atom or iodine atom. And as the hydrocarbon group, there may be mentioned an alkyl group having 1 to 20 carbon atoms, a halogenated alkyl group having 1 to 20 carbon atoms, a cycloalkyl group having 3 to 15 carbon atoms, an aromatic hydrocarbon group having 6 to 20 carbon atoms and the like.

More specifically, as the alkyl group, there may be mentioned methyl group, ethyl group, propyl group, isopropyl group, amyl group, hexyl group, octyl group, decyl group, dodecyl group, octadecyl group and the like, and the halogenated alkyl group includes a group in which at least a part of the hydrogen atom forming said alkyl group is substituted with a fluorine atom, chlorine atom, bromine atom or iodine atom. The cycloalkyl group includes a cyclohexyl group and the like and the aromatic hydrocarbon group includes a phenyl group, a naphthyl group and the like.

Further, in said general formula (3), $R^{15}$ and $R^{16}$, $R^{17}$ and $R^{18}$, $R^{15}$ and $R^{17}$, $R^{16}$ and $R^{18}$, $R^{15}$ and $R^{18}$ or $R^{16}$ and $R^{17}$ may be respectively bonded to each other (combined together) to form a monocycle or polycycle, and the monocycle or polycycle thus formed may contain a double bond. As the monocycle or polycycle formed here, there may be specifically mentioned the following groups.

[Formula 5]

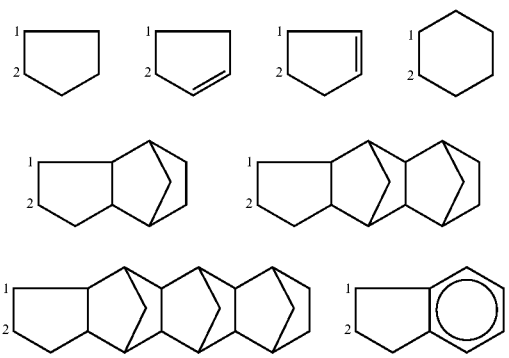

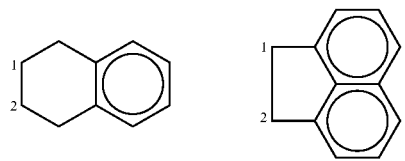

In the above exemplifications, the carbon atoms numbered by 1 or 2 represent a carbon atom to which $R^{15}(R^{16})$ or $R^{17}(R^{18})$ is respectively bonded in the formula (3). Further, $R^{15}$ and $R^{16}$ or $R^{17}$ and $R^{18}$ may form an alkylidene group in said general formula (1). Such alkylidene group is typically an alkylidene group having 2 to 20 carbon atoms. As a specific example of such alkylidene group, there may be mentioned ethylidene group, propylidene group, isopropylidene group and the like.

As the preferable cycloolefin among the said general formula (3), there may be mentioned a cycloolefin represented by the following general formula (3-1).

[Formula 6]

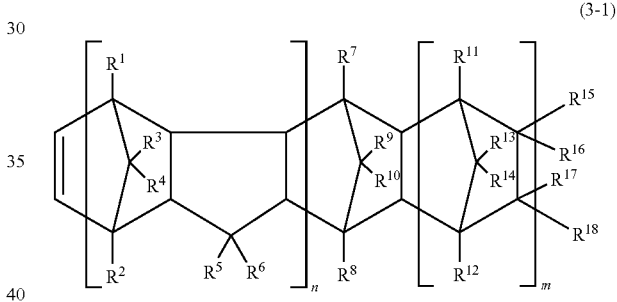

(3-1)

In the above general formula (3-1), n, m and $R^1$ to $R^{18}$ represent the same as those in said general formula (3). Further, a compound represented by the following general formula (4) may be used as a cycloolefin.

[Formula 7]

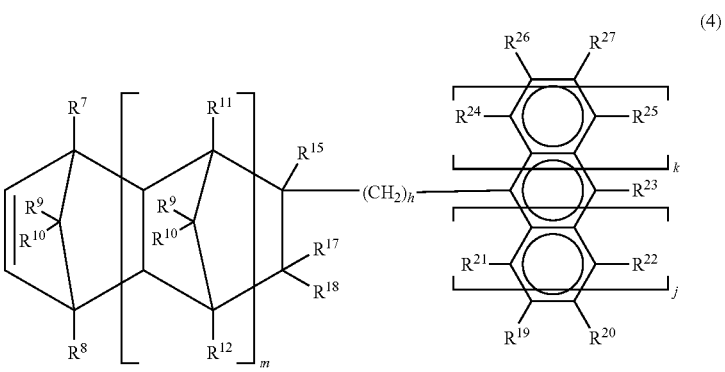

(4)

In the above general formula (4), p is 0 or a positive integer, h is 0 or a positive integer, j and k are 0, 1 or 2. $R^7$ to $R^{15}$ and $R^{17}$ to $R^{18}$ represent the same as those in the general formula [1]. Further, $R^{19}$ to $R^{27}$ each independently represent an atom or a group selected from the group consisting of a hydrogen atom, a halogen atom, a hydrocarbon group and an alkoxy group.

Here, the halogen atom is the same as a halogen atom in said general formula (3). And as the hydrocarbon group of $R^{19}$ to $R^{27}$ in the general formula (4), there may be mentioned an alkyl group having 1 to 20 carbon atoms, a halogenated alkyl group having 1 to 20 carbon atoms, a cycloalkyl group having 3 to 15 carbon atoms, an aromatic hydrocarbon group having 6 to 20 carbon atoms and the like.

More specifically, as the alkyl group, there may be mentioned methyl group, ethyl group, propyl group, isopropyl group, amyl group, hexyl group, octyl group, decyl group, dodecyl group, octadecyl group and the like, and the halogenated alkyl group includes a group in which at least a part of the hydrogen atom forming said alkyl group is substituted with a fluorine atom, chlorine atom, bromine atom or iodine atom. The cycloalkyl group includes a cyclohexyl group and the like. The aromatic hydrocarbon group includes an aryl group, an aralkyl group and the like and specifically there may be mentioned phenyl group, tryl group, naphthyl group, benzyl group, phenylethyl group and the like.

The alkoxy group includes methoxy group, ethoxy group, propoxy group and the like. Here, a carbon atom to which $R^{17}$ and $R^{18}$ are bonded and a carbon atom to which $R^{21}$ is bonded or a carbon atom to which $R^{19}$ is bonded may be bonded directly or through an alkylene group having 1 to 3 carbon atoms. In other words, when said two carbon atoms are bonded through an alkylene group, a group represented by $R^{17}$ and $R^{21}$ or a group represented by $R^{18}$ and $R^{19}$ are combined together to form an alkylene group of any of methylene group (—$CH_2$—), ethylene group (—$CH_2CH_2$—) or (—$CH_2CH_2CH_2$—)

Further, when j and k are 0, $R^{23}$ and $R^{20}$ or $R^{23}$ and $R^{27}$ may be bonded each other to form a monocylic or polycyclic aromatic ring. As the example of the monocylic or polycyclic aromatic ring in this case, there may be mentioned the following groups in which $R^{23}$ and $R^{20}$ further form an aromatic ring.

[Formula 8]

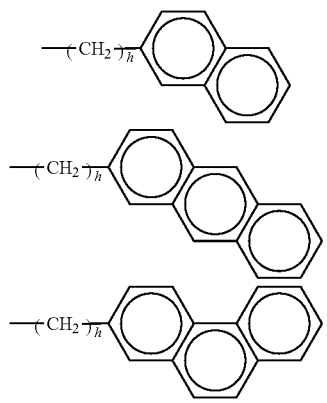

In the above formula, h represents the same h as in the general formula (4). As the cycoolefin represented by the general formulas (3) and (4) as mentioned above, there maybe specifically mentioned bicyclo[2.2.1]hept-2-ene or its derivative, tetracyclo[4.4.0.1$^{2,5}$.1$^{17,10}$]-3-dodecene or its derivative, hexacyclo[6.6.1.1$^{3,6}$.11$^{0,13}$.0$^{2,7}$.0$^{9,14}$]-4-heptadecene or its derivative, octacyclo[8.8.0.1$^{2,9}$.1$^{4,7}$.1$^{11,18}$.1$^{13,16}$.0$^{3,6}$.0$^{12,17}$]-5-dococene or its derivative, pentacyclo[6.6.1.1$^{3,6}$.0$^{2,7}$.0$^{9,14}$]-4-hexadecene or its derivative, heptacyclo-5-eicocene or its derivative, heptacyclo-5-heneicocene or its derivative, tricyclo[4.3.0.1$^{2,5}$]-3-decene or its derivative, tricyclo[1.4.0.1$^{2,5}$]-3-undecene or its derivative, pentacyclo[6.5.1.1$^{3,5}$.0$^{2,7}$.0$^{3,13}$]-4-pentadecene or its derivative, pentacyclopentadecadiene or its derivative, pentacyclo[7.4.0.1$^{2,5}$.1$^{9,12}$.0$^{8,13}$]-3-pentadecene or its derivative, heptacyclo[8.7.0.1$^{3,6}$.1$^{10,17}$.1$^{12,15}$.0$^{2,7}$.0$^{11,16}$]-4-eicocene or its derivative, nonacyclo[10.9.1.1$^{4,7}$.1$^{13,20}$.1$^{15,18}$.0$^{3,8}$.0$^{2,10}$.0$^{12,21}$.0$^{14,13}$]-5-pentacocene or its derivative, pentacyclo[8.4.0.1$^{2,5}$.1$^{9,12}$.0$^{8,13}$]-3-hexadecene or its derivative, heptacyclo[8.8.0.1$^{4,7}$.1$^{11,18}$.1$^{13,16}$.0$^{3,8}$.0$^{12,17}$]-5-heneicocene or its derivative, nonacyclo[10.10.1.1$^{5,8}$.1$^{14,21}$.1$^{16,19}$.0$^{2,11}$.0$^{4,9}$.0$^{13,22}$.0$^{15,20}$]-5-hexacocene or its derivative, 1,4-methano-1,4,4a,9a-tetrahydrofluorene or its derivative, 1,4-methano-1,4,4a,5,10,10a-hexahydroanthracene or its derivative, cyclopentadiene-acenaphthylene addition product and the like.

A cycloolefin represented by said general formula (3) or (4) may be produced by Diels-Alder reaction of cyclopentadienes with olefins having corresponding structures.

These cycloolefins may be used alone or in combination of two or more kinds.

A cycloolefin resin used in the present invention may be produced by a known production process, for example, copolymerization of a cycloolefin represented by said general formula (3) or (4) with an α-olefin and hydrogenation of said copolymer, hydrogenation of a styrene/α-olefin copolymer, hydrogenation of styrene/nonconjugated polyene copolymer, ring-opening polymerization of a cycloolefin represented by said general formula (3) or (4) and hydrogenation of said ring-opening polymer, by accordingly selecting the conditions.

When an cycloolefin resin used in the present invention is an α-olefin/cyclic olefin random copolymer, the copolymer contains 70 to 99.9 mol %, preferably 75 to 99.5 mol % of constituent units derived from a linear or branched α-olefin having 2 to 20 carbon atoms and 0.1 to 30 mol %, preferably 0.5 to 25 mol % of constituent units derived from a cyclic olefin. The α-olefin composition and cyclic olefin composition are determined by $^{13}$C—NMR.

As the linear or branched αolefin having 2 to 20 carbon atoms, there may be mentioned ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene and the like. Among α-olefins having 2 to 20 carbon atoms, ethylene is preferable.

Further, in the case of an α-olefin/cyclic olefin random copolymer, they may contain a copolymerizable monomer if needed as long as the object of the present invention is not impaired. The other copolymerizable monomer may be contained in an amount of typically not more than 20 mol % and preferably of not more than 10 mol %.

As such other monomer, there may be mentioned a linear or branched α-olefin as mentioned above, an olefin other than a polycyclic cycloolefin, nonconjugated dienes and the like. Specifically, there may be mentioned a cycloolefin such as cyclobutene, cyclopentene, cyclohexane, 3,4-dimethylcyclopentene, 3-methylcyclohexene, 2-(2-methylbutyl)-1-cyclohexene, cyclooctene and 3a,5,6,7a-tetrahydro-4,7-methano- 1H-indene; and nonconjugated dienes such as 1,4-hexadiene, 4-methyl-1,4-hexadiene, 5-methyl-1,4-hexadiene, 1,7-octadiene, dicyclopentadiene, 5-ethylidene-2-norbornene, and 5-vinyl-2-norbornene, and the like.

These other monomers may be used alone or in a combination of two or more kinds.

As the α-olefin used for the synthesis of a styrene/α-olefin copolymer, there may be mentioned said linear or branched α-olefins having 2 to 20 carbon atoms. As the conjugated polyene used for the synthesis of a styrene/nonconjugated diene copolymer, there may be mentioned conjugated dienes such as butadiene, isoprene, pentadiene and 2,3-dimethylbutadiene; and noncojugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-iso-propenyl-2-norbornene, 2,3-diisopropylidene-5-norbornene, 2-ethylidene-3-isopropylidene-5-norbornene and 2-propenyl-2,2-norbornadiene.

A cycloolefin resin may be a resin alone obtained by the production processes as mentioned above or a combination of two or more kinds of them. Moreover, it may be a resin composition in which other resins are blended in these resins.

(Additives)

As the additive used in the present invention, there may be mentioned an additive added to a conventional thermoplastic resin, for example, nucleating agent, antioxidant, hydrophilic stabilizer (or water-absorbing stabilizer), hydrochloric acid absorber, heat resistant stabilizer, light stabilizer, ultraviolet absorber, lubricant, antistatic agent, fire retardant, pigments, dyes, dispersant, copper inhibitor, neutralizer, foaming agent, plasticizer, antifoaming agent, cross-linker, flowability improver such as a peroxide, weld strength improver, mold release improver (mold lubricant).

As the antioxidant, there may be used a phenol-based antioxidant, a sulfur-based antioxidant and a phosphorus-based antioxidant.

As the phenol-based antioxidant, there may be mentioned, for example, phenols such as 2,6-di-tert-butyl-p-cresol, stearyl(3,3-dimethyl-4-hydroxybenzyl)thioglycolate, stearyl-β-(4-hydroxy-3,5-di-tert-butylphenol)propionate, distearyl-3,5-di-tert-butyl-4-hydroxybenzylphosphonate, 2,4,6-tris(3',5'-di-tert-butyl-4'-hydroxybenzylthio)-1,3,5-triazine, distearyl(4-hydroxy-3-methyl-5-tert-butylbenzyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis(4-hydroxy-3-tert-butylphenyl)butylicacid]glycolester, 4,4'-butylidenebis (6-tert-butyl-m-cresol), 1,1,3-tris(2-methyl-4-hydroxy-5-tert-butylphenol)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butyl)benzyl isocyanulate, 1,3,5-tris(3,5-di-tert-butyl-4-hydroxybenzyl)-2,4, 6-trimethyl benzene, tetrakis[methylene-3-(3,5-di-tert-butyl-4-hydroxyphenyl)propionate]methane, 1,3,5-tris(3,5-di-tert-butyl-4-hydroxybenzyl)isocyanulate, 1,3,5-tris[(3,5-di-tert-butyl-4-hydroxyphenyl)propionyloxyethyl]isocyanulate, 2-octylthio-4,6-di(4-hydroxy-3,5-di-tert-butyl)phenoxy-1,3, 5-triazine and 4,4'-thiobis(6-tert-butyl-m-cresol), and polyhydric phenol oligoester carbonates such as oligoester carbonate (having a polymerization degree of, for example 2 to 10) of 4,4'-butylidenebis(2-tert-butyl-5-methylphenol).

As the sulfur-based antioxidant, there may be mentioned, for example, a dialkyl thiodipropionate such as dilauryl, dimyristyl or distearyl thiodipropionate and an ester of (for example, pentaerythritol tetralaurylthiopropionate) of a polyhydric alcohol (for example, glycerin, trimethylolethane, trimethylolpropane, pentaerythritol and trishydroxyethyl isocyanulate) of an alkyl thiopropionic acid such as butyl, octyl, lauryl or stearyl thiopropionic acid.

As the phosphorus-based antioxidant, there may be mentioned, for example, trioctylphosphite, trilaurylphosphite, tridecylphosphite, octyl-diphenylphosphite, tris(2,4-di-tert-butylphenyl)phosphite, triphenylphosphite, tris(butoxyethyl) phosphite, tris(nonylphenyl)phosphite, distearyl pentaerythritol diphosphite, tetra(tridecyl)-1,1,3-tris(2-methyl-5-tert-butyl-4-hydroxyphenyl)butane diphosphite, tetra(C12-15 mixed alkyl)-4,4'-isopropylidene diphenyl diphosphite, tetra (tridecyl)-4,4'-butylidenebis(3-methyl-6-tert-butylphenol) diphosphite, tris(3,5-di-tert-butyl-4-hydroxyphenyl)phosphite, tris(mono/di-mixed nonylphenyl)phosphite, hydrogenated-4,4'-idopropylidene diphenol polyphosphite, bis(octylphenyl)-bis[4,4'-butylidenebis(3-methyl-6-tert-butyl phenol)]-1,6-hexanediol diphosphite, phenyl-4,4'-isopropylidenediphenol-pentaerythritol diphosphite, bis(2,4-di-tert-butylphenyl)pentaerythritol diphosphite, bis(2,6-di-tert-butyl-4-methylphenyl)pentaerythritol diphosphite, tris[4, 4'isopropylidenebis(2-tert-butylphenol)]phosphite, phenyldiisodecylphosphite, di(nonylphenyl)pentaerythritol diphosphite, tris(1,3-di-stearoyloxyisopropyl)phosphite, 4,4'-isopropylidenebis(2-tert-butylphenyl)-di(nonylphenyl) phosphite, 9,10-dihydro-9-oxa-9-oxa-10-phosphaphenanthrene-10-oxide, tetrakis(2,4-di-tert-butylphenyl)-4,4'-biphenylene diphosphonite and the like.

Further, as the other antioxidants, there may be also used 6-hydroxycoumarone derivatives, for example, various tocopherols such as α-, β-, γ- and δ-tocopherols and mixtures thereof, 2,5-dimethyl-, 2,5,8-trimethyl- and 2,5,7,8-tetramethyl-substituted products of 2-(4-methyl-pent-3-enyl)-6-hydroxy chroman, 2,2,7-trimethyl-5-tert-butyl-6-hydroxy chroman, 2,2,5-trimethyl-7-tert-butyl-6-hydroxy chroman, 2,2,5-trimethyl-6-tert-butyl-6-hydroxy chroman, 2,2-dimethyl-5-tert-butyl-6-hydroxy chroman and the like.

In addition, as the hydrochloric acid absorber, there may be used, for example, a composite compound represented by the general formula;

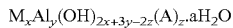

$$M_xAl_y(OH)_{2x+3y-2z}(A)_z \cdot aH_2O$$

(wherein M is Mg, Ca or Zn, A is an anion other than a hydroxyl group, x, y and z are a positive number, and a is 0 or a positive number) such as, for example, $Mg_6Al_2(OH)_{16}$ $CO_3 \cdot 4H_2O$, $Mg_6Al_2(OH)_{20}CO_3 \cdot 5H_2O$, $Mg_5Al_2(OH)_{14}$ $CO_3 \cdot 4H_2O$, $Mg_{10}Al_2(OH)_{22}(CO_3)_2 \cdot 4H_2O$, $Mg_6Al_2(OH)_{16}$ $HPO_4 \cdot 4H_2O$, $Ca_6Al_2(OH)_{16}CO_3 \cdot 4H_2O$, $Zn_6Al_2(OH)_{16}$ $CO_3 \cdot 4H_2O$, $Zn_6Al_2(OH)_{16}SO_4 \cdot 4H_2O$, $Mg_6Al_2(OH)_{16}$ $SO_3 \cdot 4H_2O$, $Mg_6Al_2(OH)_{12}CO_3 \cdot 3H_2O$ and the like.

The light stabilizer includes, for example, hydroxybenzophenones such as 2-hydroxy-4-methoxy benzophenone, 2-hydroxy-4-n-octoxy benzophenone, 2,2'-dihydroxy-4-methoxy benzophenone and 2,4-dihydroxybenzophenone; benzotriazoles such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole and 2-(2'-hydroxy-3',5'-di-tert-amylphenyl)benzotriazole; benzoates such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds such as a nickel salt of 2,2'-thiobis(4-tert-octylphenol), a nickel salt of [2,2'-thiobis(4-tert-octylphenolato)]-n-butyl amine and a nickel salt of (3,5-di-tert-butyl-4-hydroxybenzyl)phosphonic acid monoethyl ester; substituted acrylonitriles such as methyl α-cyano-β-methyl-β-(p-methoxyphenyl)acrylate; oxalic acid dianilides such as N'-2-ethylphenyl-N-ethoxy-5-tert-butylphenyl oxalic acid diamide and N-2-ethylphenyl-N'-2-ethoxyphenyl oxalic acid diamide; hindered amine compounds such as condensed products of bis(2,2,6,6-tetramethyl-4-piperidine)sebaciate, poly[{(6-(1,1,3,3-tetramethylbutyl)imino}-1,3,5-triazin-2,4-diyl{4-(2,2,6,6-tetramethylpiperidyl)imino}hexamethylene]or 2-(4-hydroxy-2,2,6,6-tetramethyl-1-piperidyl)ethanol with dimethyl succinate, or the like.

The lubricant includes, for example, aliphatic hydrocarbons such as paraffin wax, polyethylene wax and polypropylene wax; higher fatty acids such as capric acid, lauric acid, myristic acid, palmitic acid, margaric acid, stearic acid, arachic acid and behenic acid or metal salts thereof such as lithium salts, calcium salts, sodium salts, magnesium salts and potassium salts; aliphatic alcohols such as palmityl alcohol, cetyl alcohol and stearyl alcohol; aliphatic amides such as capronamide, caprylamide, caprinamide, laurylamide, myristylamide, palmitylamide and stearamide; esters of fatty acids and alcohols; fluorine compounds such as fluoroalkyl carboxylic acids or metal salts thereof and fluoroalkyl sulfonic acid metal salts, and the like.

As the hydrophilic stabilizer (or water-absorbing stabilizer), there is suitably used, for example, polyhydric alcohols described in Japanese Patent Laid-Open Publication No. H9-241484, a polyhydric alcohol described in Japanese Patent Laid-Open Publication No. 2001-26718 and a sorbitol-based derivative described in Japanese Patent Laid-Open Publication No. 2001-26682 because they provide a resin composition which is excellent in transparency and is less deteriorated in transparency under an atmosphere of high temperature and high humidity. Especially in a resin having a high hydrophobicity such as a cycloolefin resin, if it contains an extremely small amount of water in molding, cracking is likely to occur centering on the water molecule at the time when a molded article is used. A resin composition of a cycloolefin obtained by a production process of the present invention and a hydrophilic stabilizer may prevent such occurrence of cracking to the minimum and thus is very useful.

As the polyhydric alcohol used as a hydrophilic stabilizer, there may be mentioned a polyhydric alcohol which has a molecular weight of not more than 2000 and a ratio of the number of carbon atoms to the number of hydroxyl groups of 1.5 to 30, preferably of 3 to 20 and especially preferably of 6 to 20 and a carbon number of not less than 6. If the ratio and the number of carbon atoms are within the above range, the polyhydric alcohol is compatible with a cycloolefin resin and no foaming occurs in melt kneading, thereby not adversely affecting the transparency. The number of carbon atoms is preferably in the range of 6 to 100 and more preferably in the range of 6 to 60.

As said polyhydric alcohol, preferable is a polyhydric alcohol in which at least one hydroxyl group in the molecule is bonded to a primary carbon atom. The polyhydric alcohol includes ones which have an ether bond, thioether bond, alicyclic hydrocarbon group and aromatic hydrocarbon group in the molecule, and preferable is an aliphatic polyhydric alcohol. No polyhydric alcohol having an ester group is included.

As a specific example of the polyhydric alcohol, there may be mentioned 3,7,11,15-tetramethyl-1,2,3-trihydroxyhexadecane, dihydroxyoctane, trihydroxyoctane, tetrahydroxyoctane, dihydroxynonane, trihydroxynonane, tetrahydroxynonane, pentahydroxynonane, hexahydroxynonane, dihydroxy-triacontane, trihydroxy-triacontane, eicosahydroxy-triacontane and the like. Of these, preferable is 3,7,11, 15-tetramethyl-1,2,3-trihydroxyhexadecane.

In addition, as the polyhydric alcohol, there may be specifically mentioned 1,2-hexadecanediol, 2,3-heptadecanediol, 1,3-octadecanediol, 1,2-decyltetradecanediol and the like.

The sorbitol-based derivative used in the present invention is a compound represented by the following formulas (I-a) to (I-e)

[Formula 9]

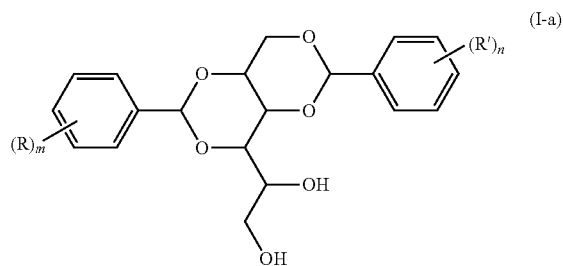

(I-a)

(In the above formula (I-a), R and R' may be the same or different from each other and are any of an alkyl group having 1 to 8 carbon atoms, a halogen atom and an alkoxy group having 1 to 4 carbon atoms, and m and n are each independently an integer of 0 to 3.)

As a compound represented by the above formula (I-a), there may be specifically exemplified 1,3,2,4-dibenzylidene sorbitol, 1,3-benzylidene-2,4-p-methyl benzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidene sorbitol, 1,3-p-chlorobenzylidene-2,4-benzylidene sorbitol, 1,3-p-chlorobenzylidene-2,4-p-methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, 1,3,2,4-di(p-chlorobenzylidene) sorbitol and a mixture of two or more kinds thereof. Of these, preferably used are 1,3,2,4-dibenzylidene sorbitol, 1,3,2,4-di (p-methylbenzylidene)sorbitol, 1,3,2,4-di(p-ethylbenzylidene)sorbitol, 1,3-p-chlorobenzylidene-2,4-p-methylbenzylidene sorbitol, 1,3,2,4-di(p-chlorobenzylidene) sorbitol and a mixture of two or more kinds thereof.

Among said sorbitol-based derivatives, a compound represented by the following formula (X) may be exemplified as a preferred example.

[Formula 10]

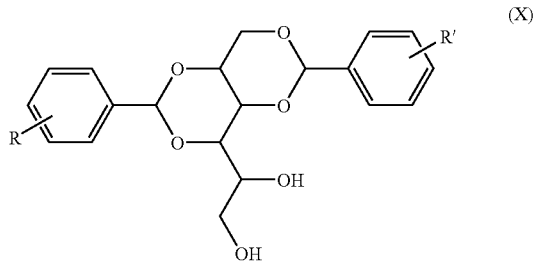

(X)

(In the above formula (X), R and R' may be the same or different from each other and represent a methyl group or an ethyl group.)

[Formula 11]

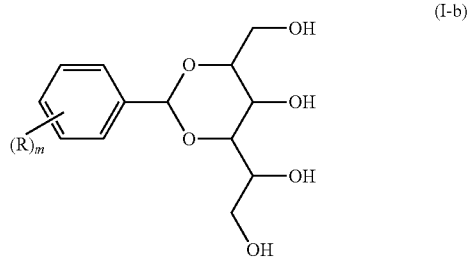

(I-b)

(In the above formula (I-b), Rs may be the same or different from each other and are any of an alkyl group having 1 to 8 carbon atoms, a halogen atom and an alkoxy group having 1 to 4 carbon atoms, and m is an integer of 0 to 3.)

As a compound represented by the above formula (I-b), there may be specifically used 2,4-benzylidene sorbitol, 2,4-p-n-propyl benzylidene sorbitol, 2,4-p-i-propylbenzylidene sorbitol, 2,4-p-n-butylbenzylidene sorbitol, 2,4-p-s-butylbenzylidene sorbitol, 2,4-p-t-butylbenzylidene sorbitol, 2,4-(2',4'-dimethylbenzylidene)sorbitol, 2,4-p-methoxybenzylidene sorbitol, 2,4-p-ethoxybenzylidene sorbitol, 2,4-p-chlorbenzylidene sorbitol and a mixture of two or more kinds thereof.

[Formula 12]

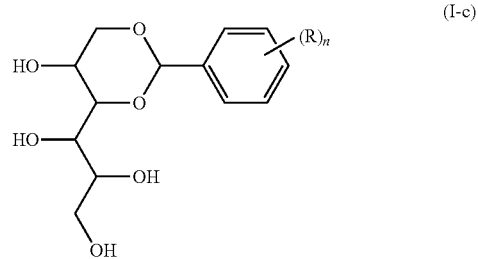

(I-c)

(In the above formula (I-c), Rs may be the same or different from each other and are any of an alkyl group having 1 to 8 carbon atoms, a halogen atom and an alkoxy group having 1 to 4 carbon atoms, and n is an integer of 0 to 3.)

As a compound represented by the above formula (I-c), there may be specifically used 1,3-benzylidene sorbitol, 1,3-p-n-propylbenzylidene sorbitol, 1,3-p-i-propylbenzylidene sorbitol, 1,3-p-n-butylbenzylidene sorbitol, 1,3-p-s-butylbenzylidene sorbitol, 1,3-p-t-butylbenzylidene sorbitol, 1,3-(2',4'-dimethylbenzylidene)sorbitol, 1,3-p-methoxybenzylidene sorbitol, 1,3-p-ethoxybenzylidene sorbitol, 1,3-p-chlorbenzylidene sorbitol and a mixture of two or more kinds thereof.

[Formula 13]

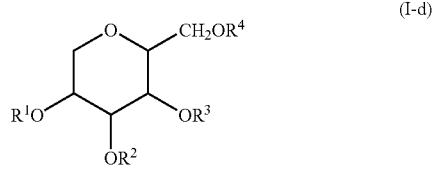

(I-d)

(In the above formula (I-d), $R^1$ to $R^4$ are an aliphatic acyl group having 10 to 30 carbon atoms or a hydrogen atom.)

As a compound represented by the above formula (I-d), there may be specifically used 1,5-sorbitan monostearate, 1,5-sorbitan distearate, 1,5-sorbitan tristearate, 1,5-sorbitan monolaurate, 1,5-sorbitan dilaurate, 1,5-sorbitan trilaurate, 1,5-sorbitan monopalmitate, 1,5-sorbitan dipalmitate, 1,5-sorbitan tripalmitate and a mixture of two or more kinds thereof.

[Formula 14]

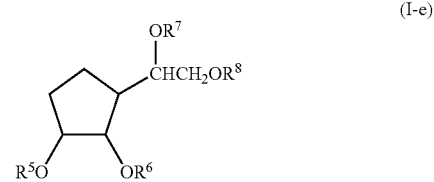

(I-e)

(In the above formula (I-e), $R^5$ to $R^8$ are an aliphatic acyl group having 10 to 30 carbon atoms or a hydrogen atom.)

As a compound represented by the above formula (I-e), there may be specifically used 1,4-sorbitan monostearate, 1,4-sorbitan distearate, 1,4-sorbitan tristearate, 1,4-sorbitan monolaurate, 1,4-sorbitan dilaurate, 1,4-sorbitan trilaurate, 1,4-sorbitan monopalmitate, 1,4-sorbitan dipalmitate, 1,4-sorbitan tripalmitate and a mixture of two or more kinds thereof.

Of the above-mentioned sorbitol-based derivatives, preferable is a benzylidene sorbitol derivative represented by said formulas (I-a) to (I-c) and more preferable is a benzylidene sorbitol derivative represented by said formula (I-a). In addition, a sorbitol derivative represented by said formulas (I-a) to (I-e) maybe used alone or in a combination of two or more kinds.

In the present invention, it may be used by mixing with a fatty acid in order to improve dispersibility of the above-mentioned sorbitol-based derivatives. A fatty acid used includes a fatty acid having 10 to 30 carbon atoms.

The addition amount of additives as mentioned above is not limited, but the additives may be usually used in an amount of 0.0001 to 10 parts by weight relative to 100 parts by weight of a thermoplastic resin.

EXAMPLE

Hereinafter, the present invention will be explained in more detail based on the Examples, but the present invention is not limited by these Examples.

The measurement methods in Examples are as follows. In measuring, there was used a test piece having an optical surface with a diameter of 45 mm and a thickness of 3 mm which was molded by an injection molding machine (IS-50, manufactured by Toshiba Machine Co., Ltd.) set at a cylinder temperature of 260° C. and a die temperature of 125° C.

Haze

The haze was measured based on ASTM D1003.

Environmental Testing (Δ Haze)

After the measurement of the above haze, the test piece was allowed to stand under an atmosphere of temperature of 80° C. and relative humidity of 90% for 48 hours. The haze was measured again and the increment compared with that before the test was recorded as Δ Haze.

Blue-Violet Laser Reliability Evaluation

A blue-violet laser light at 405±10 nm at a power density of 200 mW/cm$^2$ was irradiated on the test piece placed in a room at 60° C. for 240 hours using laser diode (TC4030S-F405ASU, manufactured by NEOARK Corporation). The change in the wavefront RMS value of the test piece was evaluated and the rate of change was classified by the following criteria. A laser interferometer (manufactured by Zygo Corp.) was used for the measurement of the RMS value.

○: No change

Δ: The rate of change of less than 0.01λ was observed.

×: The rate of change of more than 0.01λ was observed.

Or, the measurement became impossible.

Production Example 1

Resin (A) (Ethylene-Cycloolefin Copolymer)

A flash dried cycloolefin random copolymer was obtained in the similar way described in Examples of Japanese Patent Laid-Open Publication No. H3-220211. That is, the cycloolefin random copolymer was obtained by the following method.

VO(OC$_2$H$_5$)Cl$_2$ was diluted with cyclohexane to obtain a vanadium catalyst having a vanadium concentration of 6.7 mmol/liter-cyclohexane.

Ethylaluminum sesquichloride (Al(C$_2$H$_5$)$_{1.5}$Cl$_{1.5}$) was diluted with cyclohexane to obtain an organic aluminum compound catalyst having an aluminum concentration of 107 mmol/liter-cyclohexane.

A cycloolefin random copolymer was produced by continuously copolymerizing ethylene with tetracyclo[4,4,0,1$^{2,5}$,1$^{7,10}$]-3-dodecene (hereinafter simply referred to as "tetracyclododecene") as a cycloolefin using an agitation type polymerization reactor (having an inside diameter of 500 mm and a reaction volume of 100 L). In carrying out this copolymerization reaction, the vanadium catalyst prepared by said method was fed into the polymerization reactor so that the vanadium catalyst concentration to the cyclohexane used as a polymerization solvent in the polymerization reactor is 0.6 mmole/L. Furthermore, the vanadium catalyst was prediluted with cyclohexene so that the vanadium catalyst concentration just before feeding in the polymerization reactor is a two-fold dilution ratio or less with respect to the catalyst concentration in the polymerization reactor and then fed into the polymerization reactor.

Ethylaluminum sesquichloride which is an organic aluminum compound was fed into the polymerization reactor in an amount of Al/V=8.0. Said copolymerization reaction was carried out continuously at a polymerization temperature of 11° C. and at a polymerization pressure of 0.18 MPa (1.8 kg/cm$^2$G).

A cycloolefin random copolymerization solution extracted from the polymerization reactor was sent to a pipe to premix, and to the mixed solution were added a boiler water and a NaOH solution at a concentration of 25% by weight as a pH adjusting agent to stop the polymerization reaction, and further the catalyst residue remained in the copolymer was removed (deashed) from the mixed solution. The deashed mixed solution was once mixed for one hour using an agitation tank with an effective volume of 1.0 m$^3$ before proceeding to the flash drying process.

A mixed solution in which said copolymer concentration in the mixed solution was adjusted to 5% by weight was fed at a feed rate of 150 kg/H into a double tube heater (outer tube diameter: 2B, inner tube diameter: ¾ B, length: 21 m) using water vapor at a pressure of 2.0 MPa (20 kg/cm$^2$ G) as a heating source and the mixed solution was heated to 180° C.

Most of the unreacted tetracyclodecene was removed together with the polymerization solvent from the mixed solution subjected to the heating process as mentioned above by using a double tube flash dryer (outer tube diameter: 2B, inner tube diameter: ¾ B, length: 27 m) and a flash hopper (volume: 200 L). Water vapor at a pressure of 2.5 MPa (25 kg/cm$^2$ G) was used as a heating source of the double tube flash dryer. In this way, a resin A was obtained. The resin A has an intrinsic viscosity of 0.50 dl/g and a TMA of 143° C. The measurement conditions were as follows.

Intrinsic Viscosity [η]

The intrinsic viscosity was measured at 135° C. using an Atlantic type viscometer.

Softening Point [TMA]

The softening point (TMA) was determined by monitoring thermal deformation behavior of a sheet having a thickness of 1.0 mm using a thermomechanical analyzer manufactured by DuPont Corporation. That is, a needle made of quartz was placed on the sheet, a load of 50 g was applied and heated at a rate of 5° C./min, and then the temperature at which the needle penetrated into the sheet by a depth of 0.1 mm was taken as a TMA.

Production Example 2

Resin B (Ethylene-Cycloolefin Copolymer Hydrogenated Product)

A solution was prepared by dissolving a resin obtained in Production Example 1 in cyclohexane at a concentration of 15% by weight. To 300 g of the solution was added 1.3 g of a Raney nickel catalyst (the nickel content: 40% by weight) and the resulting solution was reacted at 100° C. under a hydrogen partial pressure of 3 MPa for 4 hours. After filtering off the catalyst, the reaction solution was added into acetone to precipitate a polymer, followed by filtering and drying to obtain a resin B. The hydrogenation rate of the resin B was almost 100% and the intrinsic viscosity was 0.5 dl/g and a TMA of 143° C.

Production Example 3

Resin C (Cycloolefin Ring-Opening Polymer Hydrogenated Product)

To a nitrogen-replaced 200 L reactor having a heat exchange system using a water medium were added 1,000 parts of 8-ethyltetracyclo[4.4.0.1$^{2,5}$.1$^{7,10}$]-dodeca-3-ene (hereinafter abbreviated as "ETCD") and 24,000 parts of cyclohexane, and to the mixed solution was added 68 parts of tri-i-butylaluminum [iBu$_3$Al] as a polymerization catalyst, 26 parts of isobutyl alcohol and 14 parts of acetone as a reaction regulator and 188 parts of 1-hexene diluted with 2,000 parts of cyclohexane as a molecular weight adjusting agent. The error in the addition of 1-hexene was 1%. After the temperature of the reaction solution at this stage was set at 40° C., the temperature of the water medium was set at 25° C. and a mixed solution of 18 parts of tungsten hexachloride and 15,200 parts of cyclohexane was added. The increase of the reaction heat from the start of the reaction was confirmed to be 4.3° C. and the solution was stirred at the temperature for 5 minutes. Subsequently, while controlling the temperature of the water medium and maintaining the reaction system at 45° C., into each system was dropwise added continuously a mixed solution of 19,000 parts of ETCD, 26 parts of tungsten hexachloride and 22,000 parts of cyclohexane over a period of 2 hours. After the completion of dropwise addition, the resulting solution was stirred at 45° C. for further 30 minutes to complete the ring-opening polymerization. The resulting ring-opening polymer has a weight average molecular weight (Mw) of 14,100 and a molecular weight distribution (Mw/Mn) of 2.15, and a component having a molecular weight of not less than 300,000 was not detected. In addition, since no peaks of unreacted monomers were detected by gas chromatography analysis of this reaction solution, the reaction rate was confirmed to be 100%.

The polymerization reaction solution was transferred to an autoclave, and 34,000 parts of cyclohexane was added. To the resulting solution was added 500 parts of a nickel catalyst supported on diatomaceous earth as a hydrogenation catalyst and inner atmosphere of the reaction vessel was replaced with hydrogen, followed by raising the hydrogen pressure to approximately 10 kg/cm$^2$ and heating to 160° C. under stirring. When the temperature was stabilized, the hydrogen pressure was held at 40 kg/cm$^2$, and reaction was carried out for 8 hours while supplementing the hydrogen consumed during the reaction process. After the completion of the hydrogenation reaction, the hydrogenation catalyst was filtered off and to the hydrogenated polymer solution was added 0.2 parts of pentaerythrithyl-tetrakis[3-(3,5-di-t-butyl-4-hydroxyphenyl)propionate] relative to 100 parts of the hydrogenated polymer, followed by removal of solvent at 280° C. under vacuum drying. Subsequently, the melted resin was palletized by an extruder to obtain a resin C under nitrogen atmosphere. The resin C had a Mw of 32,000, a hydrogenation of not less than 99%, a melt flow rate (MFR) of 50 g/10 min at 280° C. and a Tg of 140° C. The measurement conditions were as follows.

Molecular Weight [Mw and Mn]:

The molecular weight of a pellet dissolved in tetrahydrofuran was measured by gel permeation chromatography and the molecular weight was determined comparing with the molecular weight of the standard polystyrene.

Glass Transition Temperature [Tg]:

The Tg was measured by differential scanning calorimetry (DSC).

Production Example 4

Resin D (Styrene-Isoprene Polymer Hydrogenated Product)

To a nitrogen-replaced pressure tight vessel made of stainless steel were added 76.8 parts of styrene and 3.2 parts of isoprene, followed by mixing and stirring to prepare a mixed monomer. And then, to a nitrogen-replaced autoclave made of stainless steel equipped with an electromagnetic stirring device were charged with 320 parts of dehydrated cyclohexane, 4 parts of the mixed monomer and 0.1 parts of dibutylether. To the resulting solution was added 0.454 parts of a hexane solution (concentration: 15%) of n-butyllithium at 50° C. under stirring to start polymerization and then polymerization was carried out. After 0.5 hours had passed from the start of the polymerization (the polymerization conversion rate at this time was approximately 96%), 76 parts of the mixed monomer was continuously added over a period of 1 hour. After 0.5 hours had passed since completion of the addition of the mixed monomer (the polymerization conversion rate at this time was approximately 95%), 0.1 parts of isopropyl alcohol was added to stop the reaction to obtain a polymerization reaction solution in which a styrene-isoprene random copolymer is dissolved.

Subsequently, to 400 parts of said polymerization reaction solution was added 3 parts of a stabilized nickel hydrogenation catalyst E22U (60% nickel catalyst supported on a silica-alumina carrier, manufactured by Nikki Chemical Co., Ltd.), followed by mixing to obtain a mixed solution. The mixed solution was added to an autoclave made of stainless steel equipped with an electric heating device and an electromagnetic stirring device. Into the autoclave was fed a hydrogen gas to conduct hydrogenation reaction under stirring at 160° C. for 6 hours so as to maintain the hydrogen pressure at 4.5 MPa. After the completion of hydrogenation reaction, the resulting solution was pressure filtered at 0.25 MPa though a pressure filter (a Funda filter, manufactured by Inshikawa-jima-Harima Heavy Industries Co., Ltd.) equipped with Radio Light #800 as a filtration bed to obtain a colorless and transparent solution.

To the resulting colorless and transparent solution were added 0.1 parts of 6-[3-(3-t-butyl-4-hydroxy-5-methylphenyl)propoxy]-2,4,8,10-tetrakis-t-butylbenzo[d,f][1.3.2]dioxaphosphene (5 weight % of chloroform solution has a light transmittance at 400 nm of 99.8% measured by using a quartz cell having an optical path length of 10 mm) and 0.2 parts of a main chain hydrogenated product of a styrene-isoprene-styrene block copolymer (SEPS, the weight ratio of styrene to isoprene is 30/70, the melt flow rate is approximately 70 g/min (230° C., 2.16 kgf)) relative to 100 parts of the solid content of the polymer and dissolved.

The resulting solution was filtered through a filter made of a metal fiber (pore diameter: 0.5 µm, manufactured by Nichidai Filter Corporation). And then, the filtrate was filtered through a Zeta-plus filter 3OS (pore diameter: 0.5 to 1 µm, manufactured by Cuno K.K.) and further filtered through a filter made of a metal fiber (pore diameter: 0.2 µm, manufactured by Nichidai Filter Corporation) to remove foreign materials. The resulting filtrate (polymer concentration is 20%) was heated to 250° C. and continuously fed to a cylindrical concentration dryer (manufactured by Hitachi Ltd.) at a pressure of 3 MPa. The filtrate was concentrated by adjusting the pressure inside the concentration dryer to 60 kPa and the temperature of the polymer solution inside the dryer to 260° C. Subsequently, while the concentrated solution was maintained at 260° C., it was fed to a same type of concentration dryer at a pressure of 1.5 MPa. The solvents were removed by adjusting the pressure inside the second stage of the concentration dryer to 1.5 kPa and the temperature of the polymer to 270° C. The polymer in which the solvents were removed was extrusion molded to obtain a resin D pellet. The resin D had a Mw of 83,000, a Mw/Mn of 1.2, a hydrogenation rate of almost 100% and a Tg of 125° C.

<Production of Cycloolefin Resin Composition>

The resins A to D in a melted state were charged into extruders (1) to (3) in a manner described in Examples and Comparative Examples. The configurations of the extruders (1) to (3) are as in Table 1.

TABLE 1

|  |  | Extruder (1) | Extruder (2) | Extruder (3) |
|---|---|---|---|---|
| Rotation |  | Same direction rotation | Same direction rotation | Same direction rotation |
| Screw diameter |  | 120 mm | 120 mm | 120 mm |
| L/D between the resin introduction portion and each equipment | Vent 1 | Nearly 10 | Nearly 10 | Nearly 10 |
|  | Vent 2 | Nearly 20 | Nearly 20 | Nearly 20 |
|  | Stabilizer introduction portion 1 | 24 | 24 | 24 |
|  | Vent 3 | Nearly 30 | Nearly 30 | Nearly 30 |
|  | Stabilizer introduction portion 2 | 34 | 34 | 34 |
|  | Discharge opening | 45.5 | 52.5 | 38.5 |

Examples 1 to 8 and Comparative Examples 1 to 2

The experiments were carried out using as an additive 3,7,11,15-tetramethyl-1,2,3-trihydroxyhexadecane (hereinafter described as "TTH") or a mixture (hereinafter described as "SMS") of 1,5-sorbitan monosterate and 1,4-sorbitan monosterate under the conditions described in Table 2.

Specifically, a cycloolefin random copolymer obtained in Production Examples was charged from the resin introduction portion by the use of the twin-screw extruders with a vent described in Table 2 (provided that the kneading disk segment without a seal ring was disposed at the location so that the L/D from the resin introduction portion was the value described in Table 2.). For the operation conditions, the screw rotation speed was 250 rpm, the motor power was 50 to 60 kw and the vent pressure, unless otherwise specified, was set at 3 Torr. In some levels, as described in Table 3, the vent 3 pressure was set at atmospheric pressure for invalidity.

When the operation was stabilized, the additives described in Table 2 were continuously added from the additive introduction opening described in Table 3. The results of the haze and environmental test of the test pieces obtained by using the resulting resin compositions are shown together in Table 2.

TABLE 2

|  |  | Example 1 | Example 2 | Example 3 | Example 4 | Example 5 | Example 6 |
|---|---|---|---|---|---|---|---|
| Resin used |  | A | A | A | A | A | B |
| Extruder | Type | (1) | (2) | (3) | (1) | (2) | (1) |
|  | Kneading segment location | 40 | 47 | None | 40 | 47 | 40 |
|  | Vent 3 pressure | Atmospheric pressure | 3 Torr | Atmospheric pressure | Atmospheric pressure | Atmospheric pressure | Atmospheric pressure |
| Stabilizer | Introduction location | 1 | 2 | 1 | 1 | 1 | 1 |
|  | Type of stabilizer | TTH | TTH | TTH | SMS | SMS | TTH |
|  | Amount added (%) | 1.6 | 1.6 | 1.6 | 1.5 | 1.5 | 1.6 |
| Results | Haze (%) | 1.2 | 1.1 | 1.5 | 1.1 | 1.2 | 1.2 |
|  | Δ Haze (%) | 0.0 | 0.1 | 1.1 | 0.2 | 0.0 | 0.0 |

|  |  | Example 7 | Example 8 | Comparative Example 1 | Comparative Example 2 |
|---|---|---|---|---|---|
| Resin used |  | C | D | A | A |
| Extruder | Type | (1) | (1) | (1) | (3) |
|  | Kneading segment location | 40 | 40 | 40 | None |
|  | Vent 3 pressure | Atmospheric pressure | Atmospheric pressure | 3 Torr | 3 Torr |
| Stabilizer | Introduction location | 1 | 1 | 1 | 2 |
|  | Type of stabilizer | TTH | TTH | TTH | TTH |
|  | Amount added (%) | 1.6 | 1.6 | 1.6 | 1.6 |
| Results | Haze (%) | 1.2 | 1.2 | 1.5 | 3.9 |
|  | Δ Haze (%) | 0.2 | 0.2 | 4.1 | −0.7 |

Examples 9 to 11 and Comparative Examples 3 and 4

There was conducted an experiment under the conditions described in Table 3 in the similar manner to in Example 1 in which, in order to improve the blue-violet laser reliability, there was added 1.0% of poly[{(1,1,3,3-tetramethylbutyl)amino-1,3,5-triazine-2,4-diyle}{2,2,6,6-tetramethyl-4-pyperidyl)imino}hexamethylene{(2,2,6,6-tetramethyl-4-pyperidyl)imino}] having a molecular weight of 2000 to 3000 with respect to the resin. In Table 3, there are shown the results of the haze and the blue-violet laser reliability of the test pieces obtained by using the resulting resin compositions.

[Table 3]

TABLE 3

|  |  | Example 9 | Example 10 | Example 11 | Comparative Example 3 | Comparative Example 4 |
|---|---|---|---|---|---|---|
| Resin used |  | A | A | A | A | A |
| Extruder | Type | (1) | (2) | (3) | (1) | (3) |
|  | Kneading segment location | 40 | 47 | None | 40 | None |
|  | Vent 3 pressure | Atmospheric pressure | 3 Torr | Atmospheric pressure | 3 Torr | 3 Torr |
| Stabilizer | Introduction location | 1 | 2 | 1 | 1 | 2 |
|  | Amount added (%) | 1.0 | 1.0 | 1.0 | 1.0 | 1.0 |
| Results | Haze (%) | 1.2 | 1.1 | 1.5 | 1.5 | 3.9 |
|  | Laser reliability | ○ | ○ | ○ | Δ | X |

The invention claimed is:

1. A process for producing a cycloolefin resin composition in which, when a cycloolefin resin composition containing an additive is produced by kneading an cycloolefin resin and an additive by a twin-screw extruder equipped with a vent, an additive introduction opening is disposed downstream from the vent located nearest to the discharge opening of the twin-screw extruder and the distance between the additive introduction opening and the discharge opening of the twin-screw extruder is longer than 10D and not longer than 30D, and the additive is introduced through the introduction opening.

2. The process for producing a cycloolefin resin composition according to claim 1, wherein said twin-screw extruder equipped with a vent has an L/D of the screw in the range of 39 to 60.

3. The process for producing a cycloolefin resin composition according to claim 2, wherein said twin-screw extruder equipped with a vent has a seal ring between the vent located nearest to the discharge opening and the additive introduction opening.

4. The process for producing a cycloolefin resin composition according to claim 3, wherein said twin-screw extruder equipped with a vent has a kneading disk segment or a rotor kneading segment at a location of 0D to 25D downstream from the additive introduction opening.

5. The process for producing a cycloolefin resin composition according to claim 4, wherein said cycloolefin resin composition is used for an optical member.

6. The process for producing a cycloolefin resin composition according to claim 4, wherein said additive is a hydrophilic stabilizer.

7. The process for producing a cycloolefin resin composition according to claim 1, wherein said twin-screw extruder equipped with a vent has a seal ring between the vent located nearest to the discharge opening and the additive introduction opening.

8. The process for producing a cycloolefin resin composition according to claim 7, wherein said twin-screw extruder equipped with a vent has a kneading disk segment or a rotor kneading segment at a location of 0D to 25D downstream from the additive introduction opening.

9. The process for producing a cycloolefin resin composition according to claim 2, wherein said twin-screw extruder equipped with a vent has a kneading disk segment or a rotor kneading segment at a location of 0D to 25D downstream from the additive introduction opening.

10. The process for producing a cycloolefin resin composition according to claim 1, wherein said twin-screw extruder equipped with a vent has a kneading disk segment or a rotor kneading segment at a location of 0D to 25D downstream from the additive introduction opening.

11. The process for producing a cycloolefin resin composition according to claim 10, wherein said cycloolefin resin composition is used for an optical member.

12. The process for producing a cycloolefin resin composition according to claim 9, wherein said cycloolefin resin composition is used for an optical member.

13. The process for producing a cycloolefin resin composition according to claim 8, wherein said cycloolefin resin composition is used for an optical member.

14. The process for producing a cycloolefin resin composition according to claim 7, wherein said cycloolefin resin composition is used for an optical member.

15. The process for producing a cycloolefin resin composition according to claim 3, wherein said cycloolefin resin composition is used for an optical member.

16. The process for producing a cycloolefin resin composition according to claim 2, wherein said cycloolefin resin composition is used for an optical member.

17. The process for producing a cycloolefin resin composition according to claim 1, wherein said cycloolefin resin composition is used for an optical member.

18. The process for producing a cycloolefin resin composition according to claim 10, wherein said additive is a hydrophilic stabilizer.

19. The process for producing a cycloolefin resin composition according to claim 9, wherein said additive is a hydrophilic stabilizer.

20. The process for producing a cycloolefin resin composition according to claim 8, wherein said additive is a hydrophilic stabilizer.

21. The process for producing a cycloolefin resin composition according to claim 7, wherein said additive is a hydrophilic stabilizer.

22. The process for producing a cycloolefin resin composition according to claim 3, wherein said additive is a hydrophilic stabilizer.

23. The process for producing a cycloolefin resin composition according to claim 2, wherein said additive is a hydrophilic stabilizer.

24. The process for producing a cycloolefin resin composition according to claim 1, wherein said additive is a hydrophilic stabilizer.

* * * * *